United States Patent
Toews et al.

(10) Patent No.: US 10,131,444 B1
(45) Date of Patent: Nov. 20, 2018

(54) SYSTEM AND METHOD OF PROVIDING CLIPBOARD CUT AND PASTE OPERATIONS IN AN AVIONICS TOUCHSCREEN SYSTEM

(71) Applicant: HONEYWELL INTERNATIONAL INC., Morris Plains, NJ (US)

(72) Inventors: Philip Toews, Phoenix, AZ (US); Todd Wisner, Phoenix, AZ (US); Mark Pearson, Peoria, AZ (US); Susan McCullough, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/689,171

(22) Filed: Aug. 29, 2017

(51) Int. Cl.
  *B64D 43/00* (2006.01)
  *G06F 3/0488* (2013.01)
  *G06F 3/041* (2006.01)
  *G06F 3/0482* (2013.01)

(52) U.S. Cl.
  CPC .......... *B64D 43/00* (2013.01); *G06F 3/0412* (2013.01); *G06F 3/0482* (2013.01); *G06F 3/04883* (2013.01); *G06F 3/04886* (2013.01)

(58) Field of Classification Search
  CPC ... B64D 43/00; G06F 3/0412; G06F 3/04883; G06F 3/0482; G06F 3/04886
  See application file for complete search history.

(56) References Cited

U.S. PATENT DOCUMENTS

| | | |
|---|---|---|
| 8,832,578 B1 | 9/2014 | Shah et al. |
| 8,924,858 B2 | 12/2014 | Mistry et al. |
| 9,003,283 B2 | 4/2015 | Xu |
| 9,032,319 B1 | 5/2015 | Hammack et al. |
| 9,703,476 B1 * | 7/2017 | Pappas ............... G06F 3/04847 |
| 2007/0143382 A1 | 6/2007 | Luster |
| 2013/0120271 A1 | 5/2013 | Lee et al. |
| 2013/0191769 A1 | 7/2013 | Park et al. |
| 2014/0160049 A1 | 6/2014 | Shin |
| 2014/0285438 A1 * | 9/2014 | Kawalkar ............. B64D 43/00 345/168 |

FOREIGN PATENT DOCUMENTS

WO    2012128548 A2    9/2012

* cited by examiner

*Primary Examiner* — Michael J Zanelli
(74) *Attorney, Agent, or Firm* — Lorenz & Kopf, LLP

(57) ABSTRACT

A keyboard module configured for use in an avionics touchscreen system is disclosed. The keyboard module is configured to display, via a visual display in the avionics touchscreen system and responsive to a selection of an application program generated widget for focus via a touchscreen surface in the avionics touchscreen system, a virtual keyboard. The virtual keyboard includes a text box widget configured to display clip data stored in clipboard memory provided by the avionics touchscreen system, a copy widget configured to cause data in a first widget provided by the application program that is in focus to be copied to the clipboard memory, and a paste widget configured to cause the clip data in the clipboard memory and displayed in the text box widget to be pasted to a second widget provided by the application program that is in focus.

20 Claims, 6 Drawing Sheets

SYSTEM AND METHOD OF PROVIDING CLIPBOARD CUT AND PASTE OPERATIONS IN AN AVIONICS TOUCHSCREEN SYSTEM

TECHNICAL FIELD

The present invention generally relates to aircraft display systems, and more particularly relates to avionics touchscreen systems.

BACKGROUND

Various types of avionics equipment are being upgraded in the aircraft cockpit of older aircraft. As an example, multi-function control and display units (MCDUs), which interface with flight deck equipment such as the flight management system on the aircraft, are being replaced by touchscreen systems for displaying flight data to the flight crew. Often data needs to be copied from one location on the touchscreen and pasted into another location.

Hence, it is desirable to provide systems and methods for providing a clipboard cut and paste operation in an avionics touchscreen system. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A keyboard module configured for use in an avionics touchscreen system is disclosed. The keyboard module is configured to display, via a visual display in an avionics touchscreen system and responsive to a selection of an application program generated widget for focus via a touchscreen surface in the avionics touchscreen system, a virtual keyboard. The virtual keyboard includes a text box widget configured to display clip data stored in clipboard memory provided by the avionics touchscreen system, a copy widget configured to cause data in a first widget provided by the application program that is in focus to be copied to the clipboard memory, and a paste widget configured to cause the clip data in the clipboard memory and displayed in the text box widget to be pasted to a second widget provided by the application program that is in focus.

An avionics touchscreen system is disclosed. The avionics touchscreen system is configured for use in an aircraft cockpit and comprises a touchscreen surface layered over a visual display and one or more processors configured by programming instructions encoded in non-transient computer readable media. The avionics touchscreen system is configured to receive aircraft flight data via an aircraft data transfer system, display the flight data from an executing avionics application on the visual display, receive the selection of a widget for focus via the touchscreen surface, and display a virtual keyboard on the visual display responsive to the selection of the widget wherein the virtual keyboard includes a clipboard widget on the visual display that is configured to display clip data stored in clip data memory.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, touchscreens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
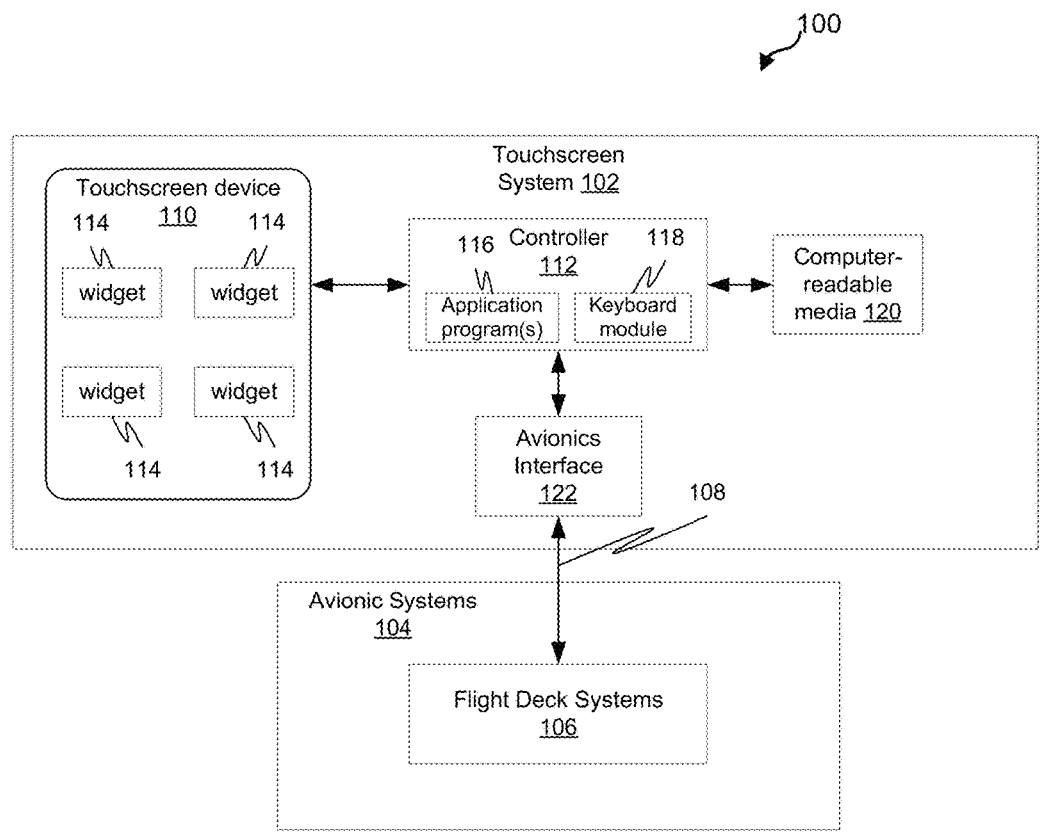
FIG. 1 is a block diagram depicting an example aircraft display system configured for use in an aircraft cockpit, in accordance with some embodiments.

FIG. 1 is a block diagram depicting an example aircraft display system 100 configured for use in an aircraft cockpit. The example aircraft display system 100 includes a touchscreen system 102 coupled to avionics systems 104 in an aircraft. The avionics systems 104 may include a variety of flight deck systems 106 such as a flight management system (FMS), a flight director (FD) system, a maintenance system, communication/navigation systems, radio systems, central maintenance computers (CMCs), forward display control systems, and other avionics systems utilized to open and interact with navigational charts, to list but a few examples. The example touchscreen system 102 is configured to communicate with the flight deck systems 106 via a standard aircraft data transfer system 108. Examples of standard aircraft data transfer systems include an ARINC 429 digital information transfer system (DITS) and an ARINC 661 system. In other examples, the touchscreen system 102 may be configured to communicate with the flight deck systems 106 via other aircraft data transfer systems such as a wireless data transfer system, a proprietary aircraft data transfer system or some other standard or non-standard aircraft data transfer system.

The example touchscreen system 102 includes a touchscreen device 110 and a touchscreen controller 112. The example touchscreen device 110 includes a touchscreen surface layered over a visual display. The touchscreen surface is configured to receive user input through single-touch or multi-touch gestures. The visual display is configured to display a graphical user interface (GUI) generated by the controller 112 during the execution of an application program. The GUI may provide one or more widgets 114 for display that may allow for displaying, entering and/or editing data.

The example controller 112 includes at least one processor and a computer-readable storage device or media. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller 112, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 112. The processors and memory of the example controller 112 are configured by the executable programming instructions to provide one or more executable applications programs 116. The example application programs 116 when executing may cause the generation of a GUI containing widgets 114 and other graphical elements on the display of the touchscreen device 110.

The processors and memory of the example controller 112 are also configured by programming instructions to provide a keyboard module 118. The keyboard module 118 when enabled is configured to cause the generation and display of a virtual keyboard on the visual display of the touchscreen device 110. The virtual keyboard may be displayed as an overlay over a GUI displayed on the visual display. The virtual keyboard may be enabled in response to the selection of a widget 114. A widget 114 may be selected or put in focus by a touch gesture on the touchscreen surface of the touchscreen device 110.

The example touchscreen controller 112 may be configured by programming instructions encoded on non-transient computer readable media 120 and loaded into local memory in the controller 112. The local memory in the controller 112 may also include clipboard memory into which data may copied for use, among other things, in transferring the data from one widget to another.

The example touchscreen system 102 also includes an avionics interface 122 for interfacing the touchscreen system 102 to flight deck systems 106 in the aircraft. The example avionics interface 122 is configured to couple to and interface with an ARINC Specification 429, digital information transfer system (DITS). In other examples, the avionics interface 122 may be configured to communicate with the flight deck systems 106 via other aircraft data transfer systems such as an ARINC 661 system, a wireless data transfer system, a proprietary aircraft data transfer system or some other standard or non-standard aircraft data transfer system.

Figure 2A:
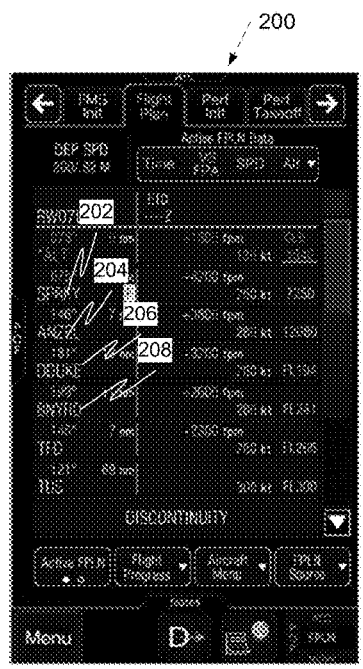
FIGS. 2A-2D depict example scenarios in which a virtual keyboard may be overlaid onto a GUI displayed on a touchscreen device and used to manipulate data, in accordance with some embodiments.
Figure 2B:
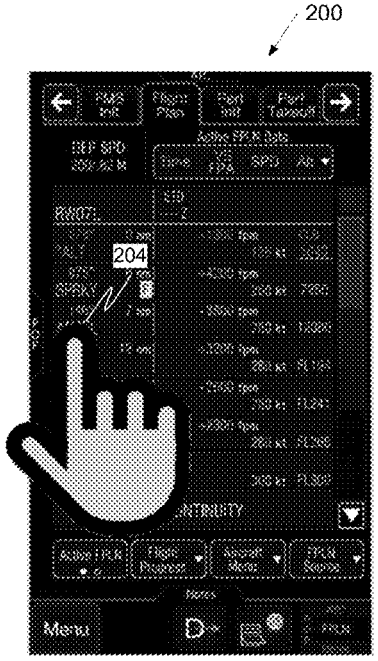
Figure 2C:
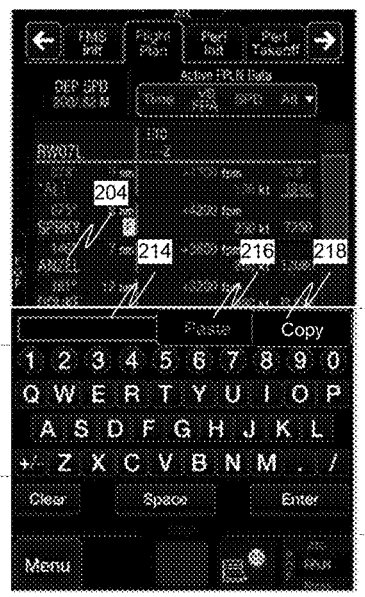
Figure 2D:
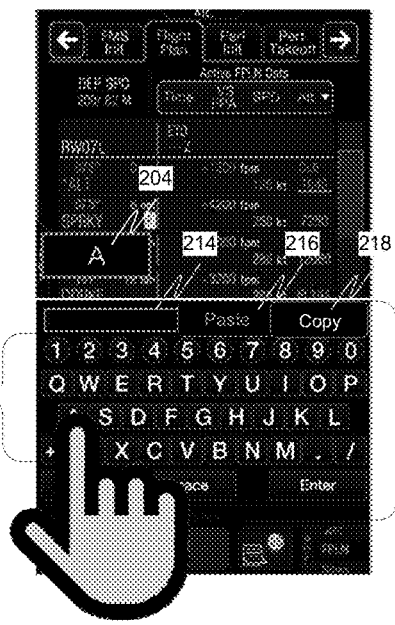

FIGS. 2A-2D depict example scenarios in which a virtual keyboard may be overlaid onto a GUI displayed on a touchscreen device and used to manipulate data. FIG. 2A is a diagram depicting an example GUI 200. The example GUI 200, among other things, displays a plurality of widgets 202, 204, 206, 208 that each display different data items. FIG. 2B is a diagram illustrating a specific widget 204 in the example GUI 200 being selected for focus. FIG. 2C is a diagram illustrating that responsive to the specific widget 204 being selected for focus, a virtual keyboard 210 is overlaid over the example GUI 200. The example virtual keyboard 210, in addition to including letter and number virtual keys 212, includes a textbox or clipboard widget 214, a copy widget 218, and a paste widget 216. FIG. 2D is a diagram illustrating that responsive to the selection of one or more keys 212, the "A" key in this example, the contents of the widget 204 in focus is changed to correspond to the data values entered via touch gestures using the virtual keyboard 210.

Figure 3A:
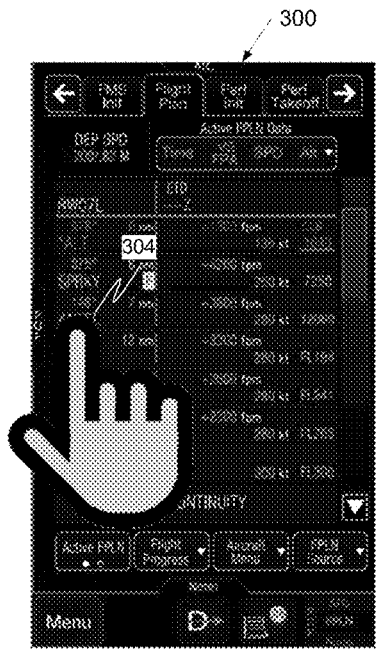
FIGS. 3A-3C depict more example scenarios in which a virtual keyboard may be overlaid onto a GUI displayed on a touchscreen device and used to manipulate data, in accordance with some embodiments.
Figure 3B:
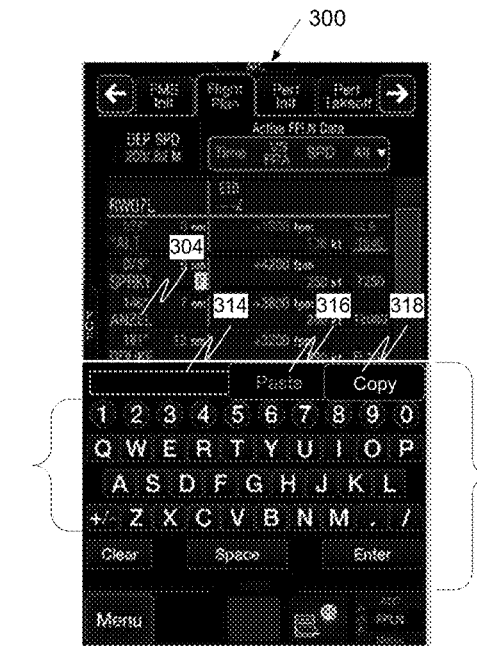
Figure 3C:
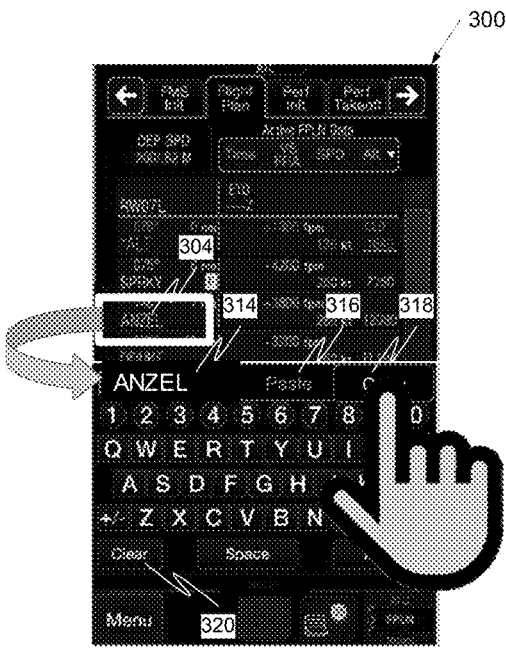

FIGS. 3A-3C depict additional example scenarios in which a virtual keyboard may be overlaid onto a GUI displayed on a touchscreen device and used to manipulate data. FIG. 3A is a diagram depicting an example GUI 300. The example GUI 300, among other things, displays a widget 304 that displays a data item. The widget 304 in the example GUI 300 is selected for focus via a touch gesture on the touchscreen. FIG. 3B is a diagram illustrating that responsive to the specific widget 304 being selected for focus, a virtual keyboard 310 is overlaid over the example GUI 300. The example virtual keyboard 310, in addition to including letter and number virtual keys 312, includes a textbox or clipboard widget 314, a copy widget 318, a paste widget 316, and a clear widget 320. FIG. 3C is a diagram illustrating that, responsive to the selection of the copy widget 318 via a touch gesture, the contents of the widget 304 in focus is copied to the clipboard widget 314 and also copied to a clipboard memory location. This action is performed, in this example, regardless of whether the clipboard widget 314 and the clipboard memory contained data prior to the copy operation. If data preexisted in the clipboard memory prior to the copy operation, in this example, the preexisting data is overwritten by the data copied from the widget 304 in focus. The contents of the clipboard memory, therefore, is visible to the flight crew. The flight crew may subsequently modify and/or paste the contents of the clipboard memory to the same or a different widget. Also, selecting the clear widget 320 via a touch gesture while the clipboard widget 314 is in focus, in some examples, may clear the clipboard widget 314.

Figure 4A:
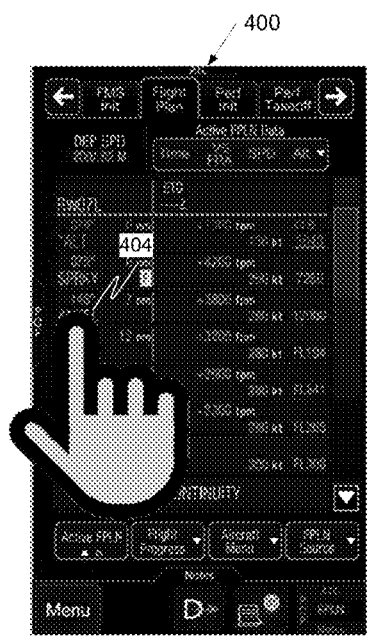
FIGS. 4A-4D depict additional example scenarios in which a virtual keyboard may be overlaid onto a GUI displayed on a touchscreen device and used to manipulate data, in accordance with some embodiments.
Figure 4B:
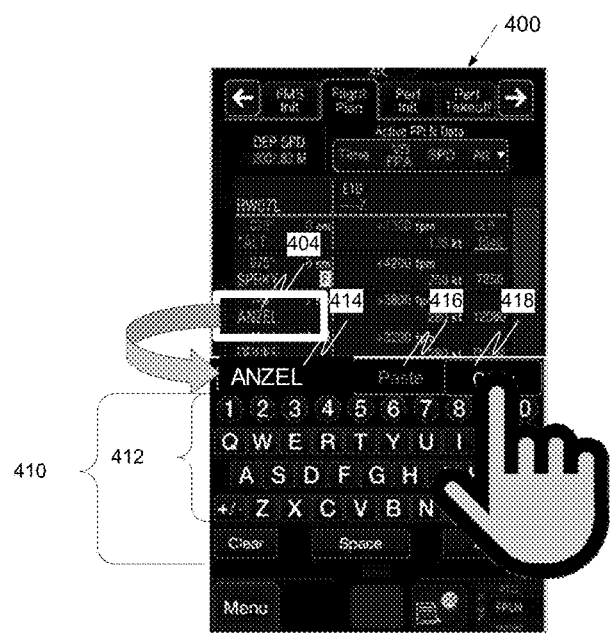
Figure 4C:
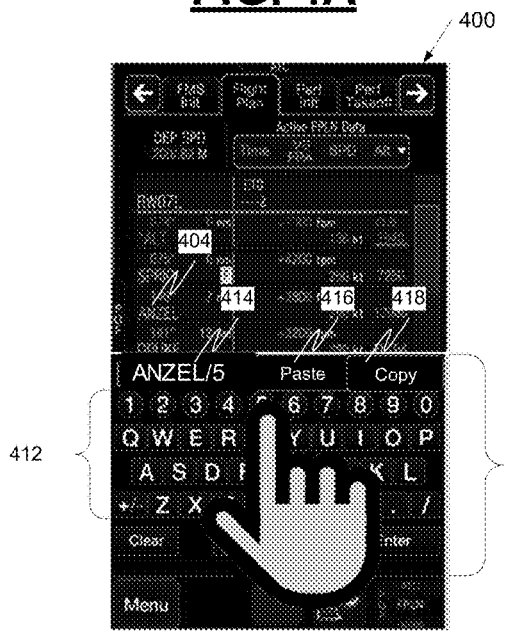
Figure 4D:
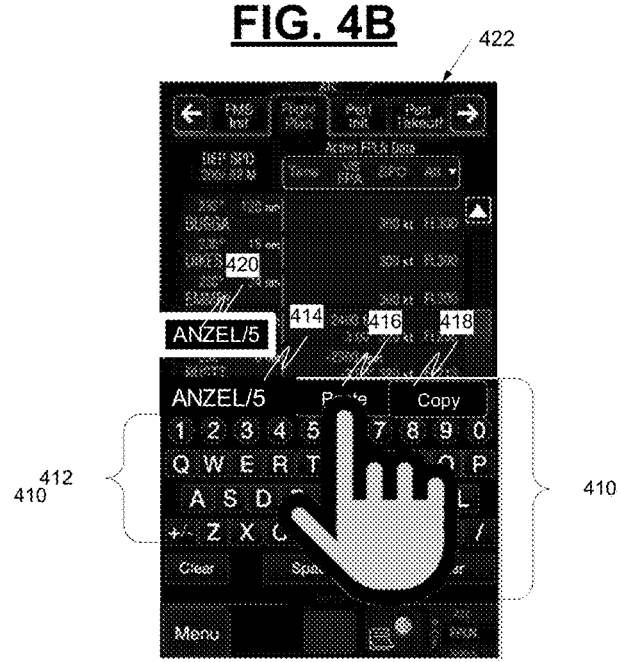

FIGS. 4A-4D depict even more example scenarios in which a virtual keyboard may be overlaid onto a GUI displayed on a touchscreen device and used to manipulate data. FIG. 4A is a diagram depicting an example GUI 400. The example GUI 400, among other things, displays a first widget 404 that displays a data item. The widget 404 in the example GUI 400 is selected for focus via a touch gesture on the touchscreen. FIG. 4B is a diagram illustrating that responsive to the first widget 404 being selected for focus, a virtual keyboard 410 is overlaid over the example GUI 400. The example virtual keyboard 410, in addition to including letter and number virtual keys 412, includes a textbox or clipboard widget 414, a copy widget 418, and a paste widget 416. FIG. 4B also illustrates that, responsive to the selection of the copy widget 418 via a touch gesture, the contents of the widget 404 in focus are copied to the clipboard widget 414 and also copied to a clipboard memory location. The contents of the clipboard memory, therefore, is visible to the flight crew. FIG. 4C is a diagram illustrating that responsive to the selection of one or more keys 412, the "/" and "5" keys in this example, the contents of the clipboard widget 414 and the clipboard memory location are changed to correspond to the data values entered via touch gestures using the virtual keyboard 410. FIG. 4D is a diagram illustrating that, responsive to the selection of the paste widget 416 via a touch gesture, the contents of the clipboard widget 414 and the clipboard memory location are copied to a second widget 420 that is in focus. In this example, the second widget 420 is different from the first widget 404 and is part of a different GUI 422. In other examples, the second widget 420 could be the same widget as the first widget 404 and on the same GUI 400.

Figure 5:
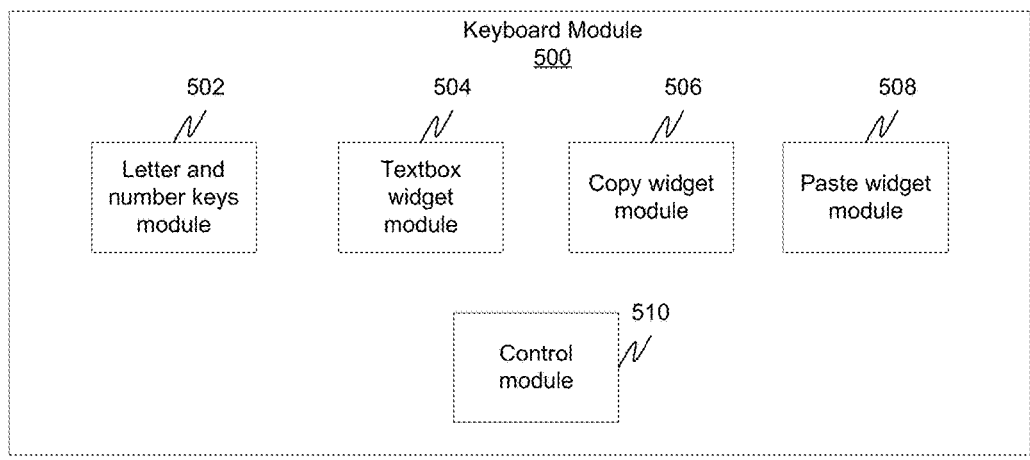
FIG. 5 is a block diagram depicting an example keyboard module that may execute within a touchscreen system, in accordance with some embodiments.

FIG. 5 is a block diagram depicting an example keyboard module 500 that may execute within a touchscreen system. The example keyboard module 500 includes a letter and number keys module 502, a textbox widget module 504, a copy widget module 506, a paste widget module 508, and a control module 510. The letter and number keys module 502 is configured to display letter and number keys as an overlay on a touchscreen visual display. The textbox widget module 504 is configured to display a textbox into which the contents of clipboard memory in the touchscreen system may be displayed as an overlay on a touchscreen visual display. The copy widget module 506 is configured to display a copy button widget that can be used to actuate a copy function wherein data contained in a widget that is in focus is copied to the clipboard memory and the textbox that is displayed as an overlay on the touchscreen visual display. The paste widget module 508 is configured to display a paste button widget that can be used to actuate a paste function wherein data contained in the textbox widget and the clipboard memory may be pasted to a widget that is in focus and displayed as an overlay on the touchscreen visual display. The control module 510 is configured to control the functioning of the keyboard module.

Through the use of the letter and number keys module 502, the textbox widget module 504, the copy widget module 506, the paste widget module 508, and the control module 510, the example keyboard module 500 is configured to display, via a visual display in the avionics touchscreen system and responsive to a selection of an application program generated widget for focus via a touchscreen surface in the avionics touchscreen system, a virtual keyboard wherein the virtual keyboard includes a text box widget configured to display clip data stored in clipboard memory provided by the avionics touchscreen system, a copy widget configured to cause data in a first widget provided by the application program that is in focus to be copied to the clipboard memory, and a paste widget configured to cause the clip data in the clipboard memory and displayed in the text box widget to be pasted to a second widget provided by the application program that is in focus.

The example keyboard module 500 is configured to copy data from the first widget to both the clipboard memory and the text box widget when the copy widget is engaged via a touch gesture. The example keyboard module 500 is configured to receive changes to the clip data displayed in the text box widget responsive to touch gestures with the virtual keyboard and update the clip data stored in the clipboard memory and displayed in the text box widget with the changes to the clip data. The example keyboard module 500 is configured to paste the clip data stored in the clipboard memory and displayed in the text box widget to the second widget when the paste widget is engaged via a touch gesture. The first widget and the second widget may be different widgets and no more than one of the first widget and the second widget may be in focus at a time. The text box widget, the paste widget, and the copy widget may be positioned in a row above all other keys or widgets in the virtual keyboard.

Figure 6:
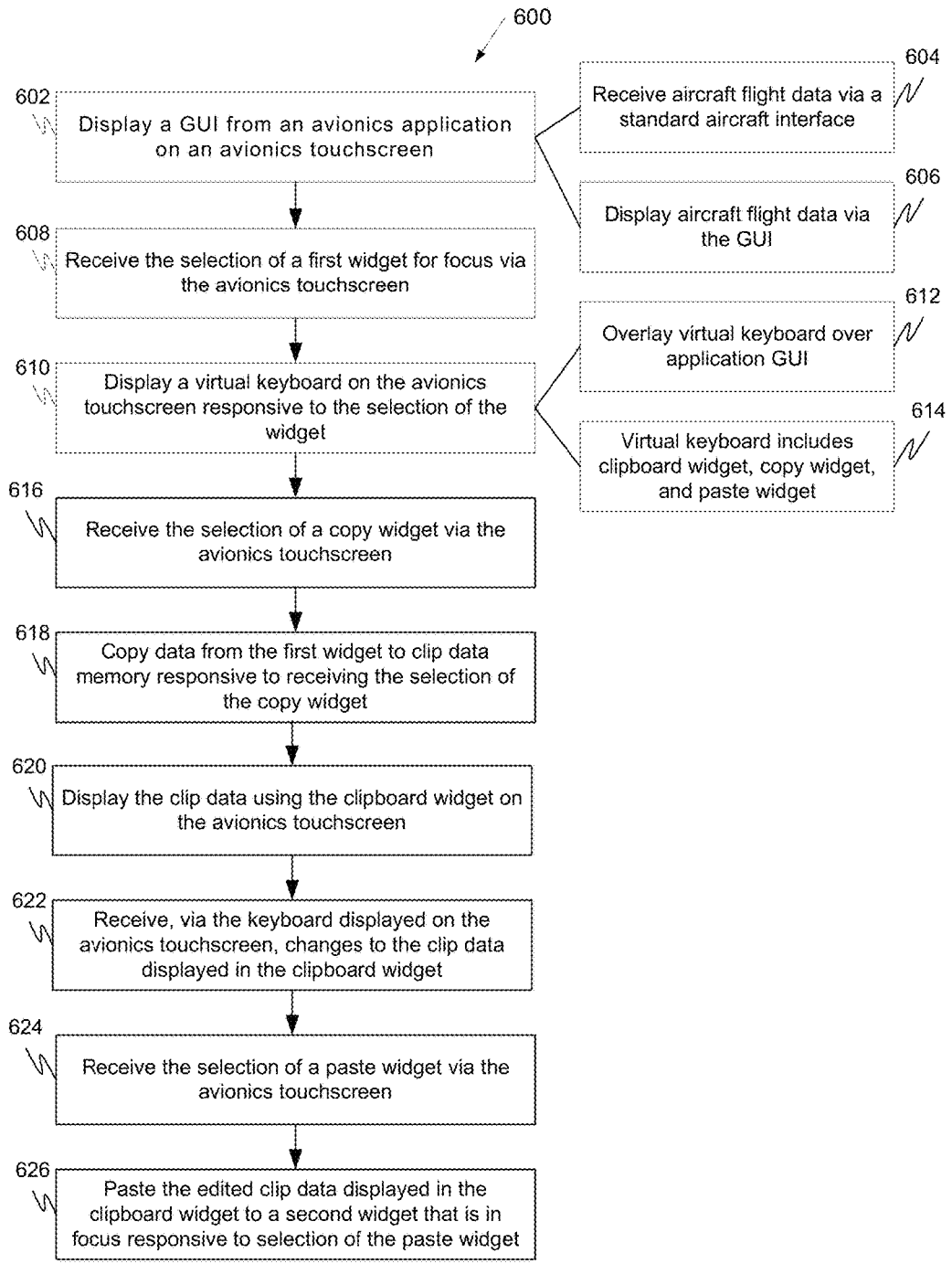
FIG. 6 is a process flow chart illustrating an example process in an example touchscreen system, in accordance with some embodiments.

FIG. 6 is a process flow chart illustrating an example process 600 in an example touchscreen system. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

The example process 600 includes displaying a graphical user interface (GUI) from an avionics application on an avionics touchscreen display (operation 602). Displaying the GUI may involve receiving aircraft flight data via a standard or non-standard aircraft interface (operation 604) and display the aircraft flight data via the GUI.

The example process 600 further includes receiving the selection of a first widget for focus via the avionics touchscreen (operation 608). Responsive to the selection of the first widget, the example process 600 includes displaying a virtual keyboard on the avionics touchscreen (operation 610). Displaying a virtual keyboard on the avionics touchscreen may include overlaying a virtual keyboard over the application GUI (operation 612) wherein the virtual keyboard includes a clipboard widget, a copy widget, and a paste widget (operation 614).

The example process 600 further includes receiving the selection of a copy widget via the avionics touchscreen (operation 616). The copy widget may be selected by a touch gesture on a touchscreen surface of the avionics touchscreen. Responsive to receiving the selection of the copy widget, the example process 600 includes copying data from the first widget to clip data memory (operation 618) and displaying the contents of the clip data memory (i.e., the clip data) using the clipboard widget on the avionics touchscreen (operation 620).

The example process 600 further includes receiving, via the keyboard displayed on the avionics touchscreen, changes to the clip data displayed in the clipboard widget (operation 622). The selection of a paste widget via the avionics touchscreen (e.g., by a touch gesture) is received (operation 624). Responsive to the selection of the paste widget, the edited clip data displayed in the clipboard widget is pasted to a second widget that is in focus (operation 626).

Described herein are techniques for implementing a copy and paste function on a touchscreen system utilized in an aircraft cockpit to display flight data from flight deck equipment. The techniques can provide the flight crew with the ability to copy, modify and enter flight data to flight deck equipment while maintaining a visual display of the data being copied, modified, and entered to reduce the chances of error or flight crew overload.

In one embodiment, an avionics touchscreen system configured for use in an aircraft cockpit and configured to communicate with an aircraft flight deck equipment is disclosed. The touchscreen system comprises an aircraft data transfer system interface for connecting the avionics touchscreen system with flight deck equipment via an aircraft data transfer system, a touchscreen device comprising a touchscreen surface layered over a visual display wherein the touchscreen surface is configured to receive input through single-touch or multi-touch gestures, and a touchscreen controller comprising one or more processors configured by programming instructions encoded on non-transient computer readable media to execute one or more application programs configured to display data received over the aircraft data transfer system interface from the flight deck equipment on the visual display wherein the touchscreen controller further comprises memory media configured to provide clipboard memory for use with the one or more application programs. The touchscreen system further comprises a keyboard module configured by the touchscreen controller to display, via the visual display and responsive to a selection of a widget generated by the application program for focus via the touchscreen surface, a virtual keyboard wherein the virtual keyboard includes a text box widget configured to display clip data stored in the clipboard memory, a copy widget configured to cause data in a first widget that is in focus to be copied to the clipboard memory, and a paste widget configured to cause the clip data in the clipboard memory and displayed in the text box widget to be pasted to a second widget that is in focus.

These aspects and other embodiments may include one or more of the following features. The aircraft data transfer system may comprise a standard aircraft data transfer system. The keyboard module may be configured to copy data from the first widget to both the clipboard memory and the text box widget when the copy widget is engaged via a touch gesture. The keyboard module may be configured to receive changes to the clip data displayed in the text box widget responsive to touch gestures with the virtual keyboard and update the clip data stored in the clipboard memory and displayed in the text box widget with the changes to the clip data. The keyboard module may be configured to paste the clip data stored in the clipboard memory and displayed in the text box widget to the second widget when the paste widget is engaged via a touch gesture. The first widget and the second widget may be the same widget. The first widget and the second widget may be different widgets and no more than one of the first widget and the second widget may be in focus at a time. The text box widget, the paste widget, and the copy widget may be positioned in a row above all other widgets in the virtual keyboard.

In another embodiment disclosed is a keyboard module configured for use in an avionics touchscreen system coupled to flight deck equipment in an aircraft cockpit via an aircraft data transfer system connection. The keyboard module comprises one or more processors configured by programming instructions encoded in non-transient computer readable media. The keyboard module is configured to display, via a visual display in the avionics touchscreen system and responsive to a selection of an application program generated widget for focus via a touchscreen surface in the avionics touchscreen system, a virtual keyboard. The virtual keyboard includes a text box widget configured to display clip data stored in clipboard memory provided by the avionics touchscreen system, a copy widget configured to cause data in a first widget provided by the application program that is in focus to be copied to the clipboard memory, and a paste widget configured to cause the clip data in the clipboard memory and displayed in the text box widget to be pasted to a second widget provided by the application program that is in focus.

These aspects and other embodiments may include one or more of the following features. The keyboard module may be configured to copy data from the first widget to both the clipboard memory and the text box widget when the copy widget is engaged via a touch gesture. The keyboard module may be configured to receive changes to the clip data displayed in the text box widget responsive to touch gestures with the virtual keyboard and update the clip data stored in the clipboard memory and displayed in the text box widget with the changes to the clip data. The keyboard module may be configured to paste the clip data stored in the clipboard memory and displayed in the text box widget to the second widget when the paste widget is engaged via a touch gesture. The first widget and the second widget may be different widgets and no more than one of the first widget and the second widget may be in focus at a time.

In another embodiment disclosed is an avionics touchscreen system configured for use in an aircraft cockpit. The avionics touchscreen system comprises a touchscreen surface layered over a visual display and one or more processors configured by programming instructions encoded in non-transient computer readable media. The avionics touchscreen system is configured to receive aircraft flight data via an aircraft data transfer system, display the flight data from an executing avionics application on the visual display, receive the selection of a widget for focus via the touchscreen surface, and display a virtual keyboard on the visual display responsive to the selection of the widget wherein the virtual keyboard includes a clipboard widget on the visual display that is configured to display clip data stored in clip data memory.

These aspects and other embodiments may include one or more of the following features. The avionics touchscreen system may be further configured to display a copy widget on the visual display as part of the virtual keyboard and copy data from the widget that is in focus to both the clip data memory and the clipboard widget when the copy widget is engaged via a touch gesture. The avionics touchscreen may be further configured to receive the selection of a second widget for focus via a touch gesture sensed by the touchscreen surface and paste data from the clipboard widget to the second widget when a paste widget is engaged via a touch gesture. The avionics touchscreen system may be further configured to display a paste widget on the visual display as part of the virtual keyboard and paste data from the clipboard widget to the widget that is in focus when the paste widget is engaged via a touch gesture. The avionics touchscreen system may be further configured to receive, via the virtual keyboard, changes to the clip data displayed in the clipboard widget and enter the changed clip data to the clip data memory. The avionics touchscreen system may be further configured to paste data from the clipboard widget to the widget that is in focus when a paste widget is engaged via a touch gesture. The avionics touchscreen system may be further configured to receive the selection of a second widget for focus via a touch gesture sensed by the touchscreen surface and paste data from the clipboard widget to the second widget when a paste widget is engaged via a touch gesture.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An avionics touchscreen system configured for use in an aircraft cockpit and configured to communicate with aircraft flight deck equipment, the touchscreen system comprising:
    an aircraft data transfer system interface for connecting the avionics touchscreen system with flight deck equipment via an aircraft data transfer system;
    a touchscreen device comprising a touchscreen surface layered over a visual display, the touchscreen surface configured to receive input through single-touch or multi-touch gestures;
    a touchscreen controller comprising one or more processors configured by programming instructions encoded on non-transient computer readable media to execute one or more application programs to display data received over the aircraft data transfer system connection from the flight deck equipment on the visual display, the touchscreen controller further comprising memory media configured to provide clipboard memory for use with the one or more application programs; and a keyboard module configured by the touchscreen controller to display, via the visual display and responsive to a selection of a widget generated by the application program for focus via the touchscreen surface, a virtual keyboard wherein the virtual keyboard includes a text box widget configured to display clip data stored in the clipboard memory, a copy widget configured to cause data in a first widget that is in focus to be copied to the clipboard memory, and a paste widget configured to cause the clip data in the clipboard memory and displayed in the text box widget to be pasted to a second widget that is in focus.

2. The avionics touchscreen system of claim 1, wherein the aircraft data transfer system comprises a standard aircraft data transfer system.

3. The avionics touchscreen system of claim 1, wherein the keyboard module is configured to copy data from the first widget to both the clipboard memory and the text box widget when the copy widget is engaged via a touch gesture.

4. The avionics touchscreen system of claim 1, wherein the keyboard module is configured to receive changes to the clip data displayed in the text box widget responsive to touch gestures with the virtual keyboard and update the clip data stored in the clipboard memory and displayed in the text box widget with the changes to the clip data.

5. The avionics touchscreen system of claim 1, wherein the keyboard module is configured to paste the clip data stored in the clipboard memory and displayed in the text box widget to the second widget when the paste widget is engaged via a touch gesture.

6. The avionics touchscreen system of claim 5, wherein the first widget and the second widget are the same widget.

7. The avionics touchscreen system of claim 5, wherein the first widget and the second widget are different widgets and no more than one of the first widget and the second widget may be in focus at a time.

8. The avionics touchscreen system of claim 1, wherein the text box widget, the paste widget, and the copy widget are positioned in a row above all other widgets in the virtual keyboard.

9. A keyboard module configured for use in an avionics touchscreen system coupled to a flight deck equipment in an aircraft cockpit via an aircraft data transfer system connection, the keyboard module comprising one or more processors configured by programming instructions encoded in non-transient computer readable media, the keyboard module configured to:

display, via a visual display in the avionics touchscreen system and responsive to a selection of an application program generated widget for focus via a touchscreen surface in the avionics touchscreen system, a virtual keyboard wherein the virtual keyboard includes a text box widget configured to display clip data stored in clipboard memory provided by the avionics touchscreen system, a copy widget configured to cause data in a first widget provided by the application program that is in focus to be copied to the clipboard memory, and a paste widget configured to cause the clip data in the clipboard memory and displayed in the text box widget to be pasted to a second widget provided by the application program that is in focus.

10. The keyboard module of claim 9, wherein the keyboard module is configured to copy data from the first widget to both the clipboard memory and the text box widget when the copy widget is engaged via a touch gesture.

11. The keyboard module of claim 9, wherein the keyboard module is configured to receive changes to the clip data displayed in the text box widget responsive to touch gestures with the virtual keyboard and update the clip data stored in the clipboard memory and displayed in the text box widget with the changes to the clip data.

12. The keyboard module of claim 11, wherein the keyboard module is configured to paste the clip data stored in the clipboard memory and displayed in the text box widget to the second widget when the paste widget is engaged via a touch gesture.

13. The keyboard module of claim 12, wherein the first widget and the second widget are different widgets and no more than one of the first widget and the second widget may be in focus at a time.

14. An avionics touchscreen system configured for use in an aircraft cockpit, the avionics touchscreen system comprising a touchscreen surface layered over a visual display and one or more processors configured by programming instructions encoded in non-transient computer readable media, the avionics touchscreen system configured to:

receive aircraft flight management system (FMS) data via an aircraft data transfer system;

display FMS data from an executing avionics application on the visual display;

receive the selection of a widget for focus via the touchscreen surface; and display a virtual keyboard on the visual display responsive to the selection of the widget, wherein the virtual keyboard includes a clipboard widget on the visual display that is configured to display clip data stored in clip data memory.

15. The avionics touchscreen system of claim 14, further configured to:

display a copy widget on the visual display as part of the virtual keyboard; and copy data from the widget that is in focus to both the clip data memory and the clipboard widget when the copy widget is engaged via a touch gesture.

16. The avionics touchscreen system of claim 15, further configured to:

receive the selection of a second widget for focus via a touch gesture sensed by the touchscreen surface; and paste data from the clipboard widget to the second widget when a paste widget is engaged via a touch gesture.

17. The avionics touchscreen system of claim 14, further configured to:

display a paste widget on the visual display as part of the virtual keyboard; and paste data from the clipboard widget to the widget that is in focus when the paste widget is engaged via a touch gesture.

18. The avionics touchscreen system of claim 14, further configured to:

receive, via the virtual keyboard, changes to the clip data displayed in the clipboard widget; and enter the changed clip data to the clip data memory.

19. The avionics touchscreen system of claim 18, further configured to:

paste data from the clipboard widget to the widget that is in focus when a paste widget is engaged via a touch gesture.

20. The avionics touchscreen system of claim 18, further configured to:
   receive the selection of a second widget for focus via a touch gesture sensed by the touchscreen surface; and
   paste data from the clipboard widget to the second widget when a paste widget is engaged via a touch gesture.

* * * * *